(12) United States Patent
Kaburagi et al.

(10) Patent No.: US 8,522,906 B2
(45) Date of Patent: Sep. 3, 2013

(54) HYDROGEN STORAGE MATERIAL, PRODUCTION METHOD OF THE HYDROGEN STORAGE MATERIAL, HYDROGEN SUPPLY SYSTEM, FUEL CELL, INTERNAL COMBUSTION ENGINE AND VEHICLE

(75) Inventors: Tomohiro Kaburagi, Yokohama (JP); Masashi Ito, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 513 days.

(21) Appl. No.: 12/747,027

(22) PCT Filed: Oct. 17, 2008

(86) PCT No.: PCT/JP2008/002947
§ 371 (c)(1),
(2), (4) Date: Jun. 9, 2010

(87) PCT Pub. No.: WO2009/075050
PCT Pub. Date: Jun. 18, 2009

(65) Prior Publication Data
US 2010/0288243 A1    Nov. 18, 2010

(30) Foreign Application Priority Data

Dec. 11, 2007  (JP) ................... 2007-319769
Oct. 14, 2008  (JP) ................... 2008-265453

(51) Int. Cl.
*H01M 8/06* (2006.01)
*C01B 3/04* (2006.01)
*B01J 7/00* (2006.01)
*F02B 43/10* (2006.01)
*B62M 6/80* (2010.01)

(52) U.S. Cl.
USPC ..... 180/207.1; 123/1 A; 206/0.7; 252/182.33; 252/182.35; 423/648.1; 429/421

(58) Field of Classification Search
USPC ............. 423/648.1, 245.1; 420/900; 429/17, 429/421; 206/0.6; 123/1 A; 252/182.33, 252/182.35; 180/207.1
See application file for complete search history.

(56) References Cited

U.S. PATENT DOCUMENTS

| | | | |
|---|---|---|---|
| 4,798,718 A | | 1/1989 | Bogdanovic |
| 5,536,586 A | * | 7/1996 | Tsushio et al. ............... 428/649 |

(Continued)

FOREIGN PATENT DOCUMENTS

| | | |
|---|---|---|
| CA | 1 135 480 A | 11/1982 |
| CN | 1208392 A | 2/1999 |

(Continued)

OTHER PUBLICATIONS

Billur Sakintuna et al., Metal Hydride Materials for Solid Hydrogen Storage: A Review, International Journal of Hydrogen Energy, 32, 2007, pp. 1121-1140.

(Continued)

*Primary Examiner* — Wayne Langel
*Assistant Examiner* — Syed Iqbal
(74) *Attorney, Agent, or Firm* — Foley & Lardner LLP (57) ABSTRACT

A hydrogen storage material includes: a first storage material body (1) which stores hydrogen; and a second storage material body (2) which stores hydrogen, and coats a surface of the first storage material body (1). A hydrogen equilibrium pressure (HP) of the second storage material body (2) is lower than that of the first storage material body (1) at the hydrogen generation temperature of the first storage material body (1).

13 Claims, 7 Drawing Sheets

(56) References Cited

U.S. PATENT DOCUMENTS

| | | | |
|---|---|---|---|
| 5,906,792 | A | 5/1999 | Schulz et al. |
| 6,040,087 | A | 3/2000 | Kawakami |
| 6,228,338 | B1 | 5/2001 | Petrie et al. |
| 6,329,101 | B1 | 12/2001 | Kawakami |
| 2006/0204799 | A1 | 9/2006 | Ishikawa et al. |
| 2009/0297896 | A1 | 12/2009 | Kimbara et al. |
| 2011/0005473 | A1 | 1/2011 | Ishikawa et al. |

FOREIGN PATENT DOCUMENTS

| | | |
|---|---|---|
| CN | 1830755 A | 9/2006 |
| JP | 59-174501 A | 10/1984 |
| JP | 60-100664 A | 6/1985 |
| JP | 6-299272 A | 10/1994 |
| JP | 2000-503292 A | 3/2000 |
| JP | 2003-147473 A | 5/2003 |
| JP | 2004-204309 (A) | 7/2004 |
| JP | 2004-256860 A | 9/2004 |
| JP | 2005-251755 A | 9/2005 |
| JP | 2006-90523 (A) | 4/2006 |
| JP | 2008-222449 A | 9/2008 |
| WO | WO 97/26214 (A1) | 7/1997 |
| WO | WO 02/062701 A1 | 8/2002 |
| WO | WO 02/062701 (A1) | 8/2002 |
| WO | WO 2007/088923 A1 | 8/2007 |

OTHER PUBLICATIONS

P. Selvam et al., Magnesium and Magnesium Alloy Hydrides, International Journal of Hydrogen Energy, vol. 11, No. 3, 1986, pp. 169-192.

Borislav Bogdanović et al., Metal-Doped Sodium Aluminium Hydrides as Potential New Hydrogen Storage Materials, Journal of Alloys and Compounds, 2000, pp. 36-58, vol. 302.

Gary Sandrock, A Panoramic Overview of Hydrogen Storage Alloys From a Gas Reaction Point of View, Journal of Alloys and Compounds, 1999, pp. 877-888, vol. 293-295.

* cited by examiner

FIG. 1 (a) COMPARATIVE EXAMPLE (b) EXAMPLE 1 (c) EXAMPLE 2

(a) EXAMPLE 1

(b) COMPARATIVE EXAMPLE

HYDROGEN STORAGE MATERIAL, PRODUCTION METHOD OF THE HYDROGEN STORAGE MATERIAL, HYDROGEN SUPPLY SYSTEM, FUEL CELL, INTERNAL COMBUSTION ENGINE AND VEHICLE

TECHNICAL FIELD

The present invention relates to a hydrogen storage material and peripheral technologies thereof. Specifically, the present invention relates to a hydrogen storage material suitable for supplying hydrogen to a mobile object, a production method of the hydrogen storage material, a hydrogen supply system, a fuel cell, an internal combustion engine and a vehicle.

BACKGROUND ART

Heretofore, there has been known a method, in the case of supplying hydrogen to a mobile object, for supplying hydrogen thereto from hydrogen storage means such as a high-pressure hydrogen gas tank, a liquefied hydrogen tank and a hydrogen absorbing alloy tank. Among them, the hydrogen absorbing alloy tank is regarded as up-and-coming since an ultra low temperature is not required therefor as in the liquefied hydrogen tank, and since a high strength is not required therefor as in the high-pressure hydrogen gas tank.

A hydrogen absorbing alloy absorbs hydrogen by being cooled or pressurized, and releases hydrogen by being heated or decompressed. In usual, at the time of absorbing hydrogen, the hydrogen absorbing alloy causes an exothermic reaction, and at the time of releasing hydrogen, the hydrogen absorbing alloy causes an endothermic reaction. With regard to a hydrogen storage method using this hydrogen absorbing alloy, a usage method of a hydrogen storage tank and the hydrogen storage tank, which are described in Patent Citation 1, are known.

Patent Citation 1: Japanese Patent Unexamined Publication No. 2006-90523

DISCLOSURE OF INVENTION

Moreover, a metal hydride in which an amount of hydrogen generated per unit weight is large has been heretofore known as a hydrogen generation material. However, in the case of using the metal hydride as the hydrogen generation material, there has been a problem that, since a hydrogen equilibrium pressure of the metal hydride is high, hydrogen cannot be suppressed from being generated in the case where the supply of hydrogen is desired to be stopped even if applying the usage method of Patent Citation 1.

The present invention has been made in consideration for such a problem inherent in the conventional technology. It is an object of the present invention to provide a hydrogen storage material capable of discontinuing and resuming the generation of hydrogen at a relatively low ambient pressure while ensuring a large amount of hydrogen generated per unit weight, and to provide a production method of the hydrogen storage material, a hydrogen supply system, a fuel cell, an internal combustion engine and a vehicle.

According to one aspect of the present invention, there is provided a hydrogen storage material including: a first storage material body which stores hydrogen; and a second storage material body which stores hydrogen, and coats a surface of the first storage material body, wherein a hydrogen equilibrium pressure of the second storage material body is lower than that of the first storage material body at the hydrogen generation temperature of the first storage material body.

BEST MODE FOR CARRYING OUT THE INVENTION (Hydrogen Storage Material)

A hydrogen storage material of the present invention includes a first storage material body and a second storage material body, which store hydrogen. Then, a surface of the first storage material body is coated with the second storage material body. Moreover, a hydrogen equilibrium pressure at a hydrogen generation temperature of the first storage material body is lower in the second storage material body than in the first storage material body.

A description will be made in detail of a configuration, functions and effects of the above-described hydrogen storage material by using the drawings. FIGS. 1(a) to 1(c) are cross-sectional views showing particles of hydrogen storage materials of examples according to the present invention: FIG. 1(a) shows a hydrogen storage material of Comparative example; FIG. 1(b) shows a hydrogen storage material of Example 1; and FIG. 1(c) shows a hydrogen storage material of Example 2.

The hydrogen storage material of Comparative example, which is shown in FIG. 1(a), is composed of a first storage material body 1 using aluminium hydride ($AlH_3$), in which an average particle diameter D is approximately 100 micrometers.

The hydrogen storage material of Example 1, which is shown in FIG. 1(b), is one in which an entire surface of the first storage material body 1 with an average particle diameter D of approximately 100 micrometers is completely coated with a layer of the second storage material body 2 with a thickness t1 of approximately 1 micrometer. Aluminium hydride ($AlH_3$) is used as the first storage material body 1, and sodium aluminium hydride ($NaAlH_4$) is used as the second storage material body 2.

The hydrogen storage material of Example 2, which is shown in FIG. 1(c), is one in which an entire surface of the first storage material body 1 with an average particle diameter D of approximately 100 micrometers is completely coated with a layer of the second storage material body 2 with a thickness t2 of approximately 5 micrometers. Aluminium hydride ($AlH_3$) is used as the first storage material body 1, and sodium aluminium hydride ($NaAlH_4$) is used as the second storage material body 2.

In aluminium hydride as the first storage material body 1, the number of hydrogen atoms released from one molecule of aluminium hydride is large as in the following Chemical formula 1. Therefore, in aluminium hydride, a hydrogen storage amount per unit weight is as large as approximately 10 wt %, and aluminium hydride is advantageous as a hydrogen storage material for a mobile object.

$$AlH_3 \rightarrow Al + (3/2)H_2 \quad \text{[Chem.1]}$$

However, a hydrogen equilibrium pressure of aluminium hydride at the hydrogen generation temperature (approximately 200 degrees Celsius) is as significantly high as 10 GPa. Therefore, in the case where a temperature of aluminium hydride is raised once to a decomposition temperature thereof, it becomes difficult to discontinue generation of hydrogen even if an internal pressure of a container of aluminium hydride is increased by closing a valve that supplies hydrogen from the container to an apparatus that uses hydrogen. Moreover, it is difficult and irrational to manufacture the container containing aluminium hydride as the hydrogen storage material so that a withstand pressure of the container can be the hydrogen equilibrium pressure of aluminium hydride or more.

As opposed to this, sodium aluminium hydride as the second storage material body 2 releases hydrogen by a decomposition reaction of the following Chemical formula 2. Sodium aluminium hydride generates a smaller amount of hydrogen per unit weight than aluminium hydride. However, a hydrogen equilibrium pressure of sodium aluminium hydride is sufficiently lower than the hydrogen equilibrium pressure of aluminium hydride. Specifically, the hydrogen equilibrium pressure of sodium aluminium hydride is 0.1 MPa at 50 degrees Celsius, 1.0 MPa at 100 degrees Celsius, and 0.5 MPa at 150 degrees Celsius.

$$NaAlH_4 \rightarrow (1/3)Na_3AlH_6 + (2/3)Al + H_2 \quad \text{[Chem.2]}$$

In the present invention, the surface of the first storage material body 1, in which such a hydrogen generation amount per unit weight is large and the hydrogen equilibrium pressure is high, is coated with the second storage material body 2, in which the hydrogen equilibrium pressure is lower than in the first storage material body 1. In such a way, the entirety of the hydrogen storage material can be made as a material in which the hydrogen generation amount per unit weight is large and the hydrogen equilibrium pressure is low. Therefore, in the case of discontinuing release of hydrogen, the valve that supplies hydrogen from the container containing the hydrogen storage material to the apparatus that uses hydrogen is closed, whereby the internal pressure of the container is increased to be set at the hydrogen equilibrium pressure of the second storage material body 2 or more. In such a way, the release of hydrogen from the hydrogen storage material can be discontinued with ease. In the case of resuming the release of hydrogen, the valve that supplies hydrogen is opened to lower the internal pressure of the container, whereby hydrogen can be released from the hydrogen storage material.

Figure 2:
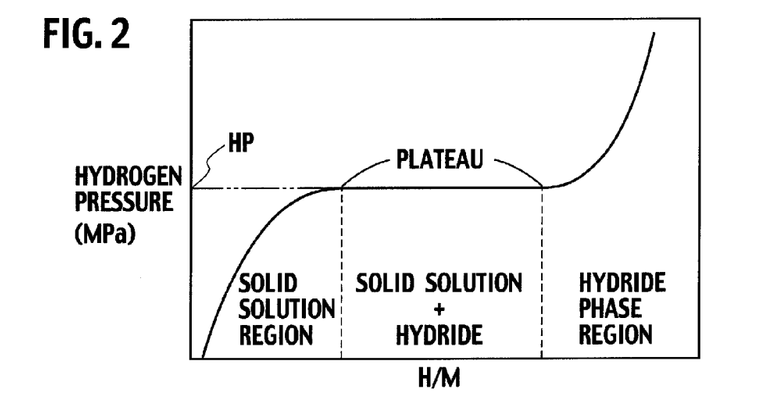
FIG. 2 is a view for explaining a hydrogen equilibrium pressure.

Note that, in this specification, as shown in FIG. 2, the hydrogen equilibrium pressure is a hydrogen pressure HP in a Plateau region in a pressure-composition isotherm (PCT curve) at the time of a predetermined temperature. Here, the pressure-composition isotherm is concerned with the first storage material body 1 and the second storage material body 2. The pressure-composition isotherm is a graph showing a relationship between the hydrogen pressure and a hydrogen concentration at a fixed temperature in the case of evaluating equilibrium hydrogen storage characteristics. As shown in FIG. 2, an axis of ordinates represents the hydrogen pressure, and an axis of abscissas represents the hydrogen concentration (H/M). H/M denotes the number of hydrogen atoms with respect to one metal atom in the hydrogen storage material.

As shown in FIG. 2, in the case where the hydrogen storage material stores hydrogen, the hydrogen storage material turns to a state of a hydride phase region on a right side of the graph. In the case where the hydrogen storage material releases hydrogen from this state, the hydrogen storage material turns, along the curve in the graph, to a state of the Plateau region in which a solid solution from which hydrogen is desorbed and a hydride phase coexist. In the case where the hydrogen storage material further releases hydrogen, the hydrogen storage material turns to a state of a solid solution region on a left side of the graph. In the case where the hydrogen storage material is sodium aluminium hydride, the hydrogen storage material is in a state of sodium aluminium hydride in the hydride phase region, turns to a state where sodium aluminium hydride and a solid solution of sodium and aluminium coexist in the Plateau region, and turns to a state of the solid solution of sodium and aluminium in the solid solution region.

In this specification, as shown in FIG. 2, the hydrogen equilibrium pressure refers to the hydrogen pressure HP in the Plateau region at the time when hydrogen is released. Moreover, the hydrogen equilibrium pressure can also refer to a hydrogen pressure in a hydrogen tank that holds the hydrogen storage material therein. Here, the hydrogen pressure is necessary to discontinue a hydrogen generation reaction.

The first storage material body 1 may be any as long as a hydrogen equilibrium pressure thereof is higher than that of the second storage material body 2 at the hydrogen generation temperature of the first storage material body 1. However, as the first storage material body 1, one is preferable, in which the hydrogen generation amount per unit weight is large. As the first storage material body 1, for example, any of a metal hydride, a carbon material, zeolite and an organometallic complex can be used.

As the metal hydride (hereinafter, also referred to as a first metal hydride) serving as the first storage material body 1, there are mentioned aluminium hydride ($AlH_3$), a hydrogen absorbing alloy containing magnesium (Mg), and a hydrogen absorbing alloy containing titanium (Ti).

As the hydrogen absorbing alloy containing magnesium (Mg), there are mentioned a magnesium-zinc alloy ($MgZn_2$), a magnesium-nickel alloy ($Mg_2Ni$), a magnesium-copper alloy ($Mg_2Cu$) and the like. As the hydrogen absorbing alloy containing titanium (Ti), there are mentioned a titanium-iron alloy (TiFe), a titanium-cobalt alloy (TiCo), a titanium-chromium-vanadium alloy (Ti—Cr—V) and the like. Moreover, an alloy of Mg and Ti is a hydrogen absorbing alloy containing both of Mg and Ti.

As the carbon material serving as the first storage material body 1, there are mentioned carbon nanohorn, carbon nanotube, graphite nanofiber, aromatic hydrocarbon and the like.

As the second storage material body 2, for example, any of the metal hydride, the carbon material, the zeolite and the organometallic complex can be used. However, it is necessary that the second storage material body 2 be a material in which the hydrogen equilibrium pressure at the hydrogen generation temperature of the first storage material body 1 be lower than in the first storage material body 1.

As the metal hydride (hereinafter, also referred to as a second metal hydride) serving as the second storage material body 2, a second metal hydride different in type from the first metal hydride can be used. The second metal hydride may be any as long as a hydrogen equilibrium pressure thereof is lower than that of the first storage material body 1 at the hydrogen generation temperature of the first storage material body 1. As the second metal hydride, for example, preferable is a hydride of aluminium and alkaline metal, a hydride of aluminium and alkaline earth metal, a hydride of boron and the alkaline metal or a hydride of the boron and the alkaline earth metal. As the hydride of aluminium and the alkaline metal, there are mentioned lithium aluminium hydride (LiAlH$_4$), potassium aluminium hydride (KAlH$_4$), sodium aluminium hydride (NaAlH$_4$) and the like. As the hydride of aluminium and the alkaline earth metal, magnesium aluminium hydride (Mg(AlH$_4$)$_2$), calcium aluminium hydride (Ca(AlH$_4$)$_2$) and the like are mentioned. As the hydride of the boron and the alkaline metal, there are mentioned lithium boron hydride (LiBH$_4$), potassium boron hydride (KBH$_4$), sodium boron hydride (NaBH$_4$) and the like. As the hydride of the boron and the alkaline earth metal, magnesium boron hydride (Mg(BH$_4$)$_2$), calcium boron hydride (Ca(BH$_4$)$_2$) and the like are mentioned.

The hydrogen equilibrium pressure of the second storage material body 2 during the hydrogen release becomes a hydrogen equilibrium pressure of the entirety of the hydrogen storage material according to the present invention. Therefore, it is preferable that the hydrogen equilibrium pressure of the second storage material body 2 be a pressure substantially equal to a hydrogen supply pressure to such a hydrogen-using apparatus to be described later, for example, be 0.2 MPa or more to 15 MPa or less.

Moreover, in the case of using the above-described second metal hydride as the second storage material body 2, the second metal hydride is preferably one that dissolves in a nonpolar organic solvent in order to form a layer of the second metal hydride on the surface of the first storage material body 1.

Note that, with regard to the coating of the second storage material body 2 on the first storage material body 1, the second storage material body 2 may be coated on a primary particle of the first storage material body 1. Alternatively, the second storage material body 2 may be coated on a secondary particle formed by coagulating the primary particles of the first storage material body 1.

The thickness t1 of the second storage material body 2 that coats the surface of the first storage material body 1 is set at least at several nanometers in any case without being limited to the above-described Examples 1 and 2. If the thickness of the second storage material body 2 is too thick, then it takes long for the hydrogen released from the inner first storage material body 1 to pass through such a film of the second storage material body 2 and to reach the surface of the hydrogen storage material, resulting in a decrease of responsiveness of the hydrogen release. Accordingly, this is not preferable. On the contrary, if the thickness of the second storage material body 2 is too thin, then the film of the second storage material body 2 becomes prone to be broken. In the case where the film of the second storage material body 2 is broken, hydrogen that is at a high pressure is released from the first storage material body 1. Therefore, there is an apprehension that the hydrogen release may not be stopped until the hydrogen release from the first storage material body 1 of the particle of the hydrogen storage material is ended. Specifically, it is preferable that the thickness t1 and t2 of the second storage material body 2 be 5 nanometers to 20 micrometers. Moreover, it is preferable that the particle diameter D of the first storage material body 1 be larger than the thickness t1 and t2 of the second storage material body 2 and range from 10 micrometers to 300 micrometers.

The hydrogen released from the first storage material body 1 owing to the breakage of the second storage material body 2 resides in the container of the hydrogen storage material, and increases the pressure in the container. However, since the particle diameter of the hydrogen storage material of the present invention is small as described above, an influence of a total amount of hydrogen released from the particles in which the films are broken on the increase of the internal pressure of the container can be mostly ignored in a usual case.

Figure 1:
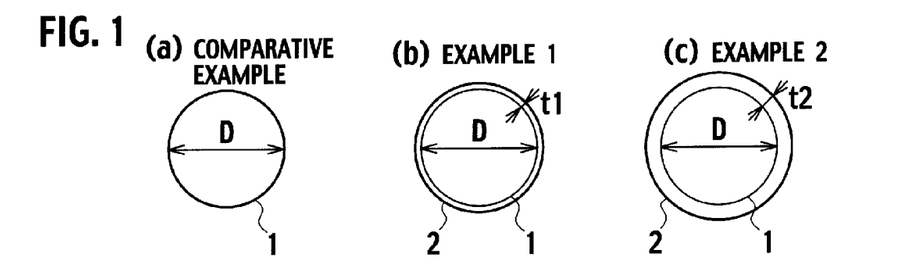
FIG. 1(a) is a schematic cross-sectional view of a hydrogen storage material of Comparative example.
FIG. 1(b) is a schematic cross-sectional view of a hydrogen storage material of Example 1.
FIG. 1(c) is a schematic cross-sectional view of a hydrogen storage material of Example 2.

Here, in each of FIG. 1(*b*) and FIG. 1(*c*), the first storage material body 1 and the second storage material body 2 form a two-layer structure. However, the hydrogen storage material of the present invention has the functions of the present invention even if a region having a composition in which components of the first storage material body 1 and the second storage material body 2 are mixed together is provided between the particle of the first storage material body 1 and the layer of the second storage material body 2.

Next, a description will be made of a production method of the hydrogen storage material of the present invention. An outline of the production method is a method for impregnating and supporting a solution, in which the second storage material bodies 2 are dissolved, into and on microparticles of the first storage material bodies 1. By this impregnation supporting method, the films of the second storage material bodies 2 can be easily formed at such a fixed thickness on the entire surfaces of the particles of the first storage material bodies 1.

The production method of the hydrogen storage material according to the present invention includes the steps of: preparing a solution in which second storage material bodies are dissolved in a nonpolar organic solvent; immersing microparticles of first storage material bodies in the solution, thereby impregnating and supporting the second storage material bodies into and on surfaces of the particles of the first storage material bodies; and evaporating the solvent from the microparticles having the solution impregnated thereinto and supported thereon, thereby drying the microparticles.

As the nonpolar organic solvent for use in such a solution preparation step, ethers and tetrahydrofuran (THF) are mentioned. Moreover, as the nonpolar organic solvent, one is preferable, in which a solubility for the first storage material bodies is low and a solubility for the second storage material bodies is high. For example, in the case of using lithium aluminium hydride (LiAlH$_4$) as the second storage material bodies, diethyl ether is suitable as the nonpolar organic solvent.

In such an impregnation supporting step, the microparticles of the first storage material bodies are mixed into the solution in which the second storage material bodies are dissolved, and a mixture thus obtained is stirred, followed by filtration. Moreover, in such a drying step for removing the solvent, high-temperature heating is not preferable in order to prevent combustion of the solvent and not to cause the hydrogen release from the hydrogen storage material, and it is preferable to dry the microparticles at 80 degrees Celsius or less. Note that the above-described respective steps are preferably performed in an atmosphere of inert gas such as nitrogen and argon in order to prevent oxidation of the first storage material bodies and the second storage material bodies.

Note that the step of performing micro milling for the first storage material bodies may be added before immersing the first storage material bodies in the solution in which the second storage material bodies are dissolved. In such a milling step, the first storage material bodies are milled, for example, by using a ball mill or a mortar, and are thereby formed into the microparticles. As described above, it is preferable that the particle diameter of the microparticles be 10 micrometers to 300 micrometers. In the case where first storage material bodies, which are formed into the microparticles in advance, are available, this milling step can be omitted naturally. Moreover, the step of arranging a size of the particles by means of a sieve or the like may be further added after the milling step.

As described above, in accordance with the above-described production method, the second storage material bodies can be uniformly coated on the surfaces of the first storage material bodies by such relatively simple steps. Note that, in the above-described production method of the hydrogen storage material, the first storage material bodies are impregnated into the solution in which the second storage material bodies are dissolved, whereby the second storage material bodies are coated on the entire surfaces of the particles of the first storage material bodies. However, the solution in which the second storage material bodies are dissolved may be coated on the surfaces of the first storage material bodies by spraying the solution thereon if the second storage material bodies can be thereby coated on the surfaces of the first storage material bodies.

A description will be made below more in detail of the above-described Examples 1 and 2, however, the present invention is not limited to these examples.

Example 1

First, aluminium hydride with an average particle diameter of approximately 100 micrometers was prepared by a liquid phase synthesis method. Note that, aluminium hydride was prepared based on the method described in the specification of U.S. Pat. No. 6,228,338.

Moreover, sodium aluminium hydride was dissolved into diethyl ether, whereby 200 mL of a diethyl ether solution in which a concentration of sodium aluminium hydride was 0.30 M was prepared.

Next, 1 g powder of the prepared aluminium hydride was put into the above-described diethyl ether solution, followed by stirring for 1 hour, whereby sodium aluminium hydride was impregnated into and supported on surfaces of aluminium hydride. Thereafter, sodium aluminium hydride thus impregnated and supported was sucked and filtered, and was dried at 80 degrees Celsius for 1 hour in an argon flow. As described above, the hydrogen storage material of Example 1 was prepared. Note that the preparation of the above-described hydrogen storage material of Example 1 was performed entirely in an argon atmosphere.

Example 2

In a similar way to Example 1, first, aluminium hydride with an average particle diameter of approximately 100 micrometers was prepared. Moreover, sodium aluminium hydride was dissolved into diethyl ether, whereby 200 mL of a diethyl ether solution in which a concentration of sodium aluminium hydride was 0.75 M was prepared.

Next, 1 g powder of the prepared aluminium hydride was put into the above-described diethyl ether solution, followed by stirring for 3 hours, whereby sodium aluminium hydride was impregnated into and supported on surfaces of aluminium hydride. Thereafter, sodium aluminium hydride thus impregnated and supported was sucked and filtered, and was dried at 80 degrees Celsius for 1 hour in an argon flow. As described above, the hydrogen storage material of Example 2 was prepared. Note that the preparation of the above-described hydrogen storage material of Example 2 was performed entirely in an argon atmosphere.

Comparative Example

In a similar way to Example 1, aluminium hydride with an average particle diameter of 100 micrometers was prepared, and aluminium hydride thus prepared was used as the hydrogen storage material of Comparative example.

(Evaluation of Hydrogen Storage Material)

For the hydrogen release amounts and hydrogen release rates of the obtained hydrogen storage materials of Examples 1 and 2 and Comparative example, the following evaluations were performed.

Figure 3:
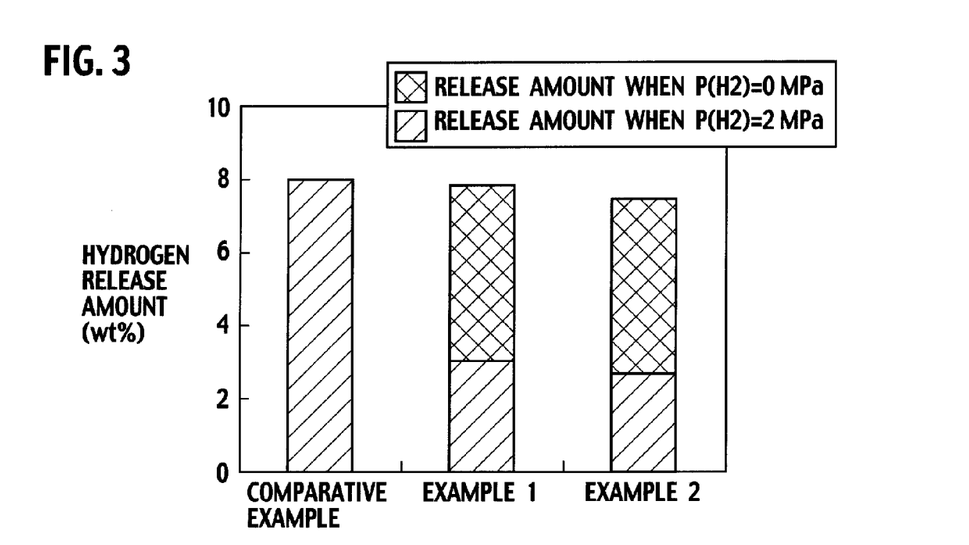
FIG. 3 is a graph showing amounts of hydrogen released from the hydrogen storage materials of Comparative example, Example 1 and Example 2 when ambient pressures are 2 MPa and 0 MPa.

FIG. 3 is a graph showing comparison among the hydrogen release amounts (wt %) of the above-described Example 1, Example 2 and Comparative example. Specifically, FIG. 3 shows the hydrogen release amounts of Examples 1 and 2 and Comparative example in the case where ambient hydrogen pressures (hereinafter, also referred to as ambient pressures) of the hydrogen storage materials according to Examples 1 and 2 and Comparative example are 2 MPa, that is, in the case where hydrogen pressures in the containers in the case where the hydrogen storage materials are contained therein are 2 MPa. As shown in FIG. 3 in the case where the ambient hydrogen pressures of the hydrogen storage materials are 2 MPa, the hydrogen release amounts of Example 1 and Example 2 were 2.94 wt % and 2.64 wt %, respectively, and meanwhile, the hydrogen release amount of Comparative example was 8.00 wt %. Next, in the case where the containers were evacuated to reduce the ambient hydrogen pressures to 0 MPa, the hydrogen release amounts of Examples 1 and 2 were 7.86 wt % and 7.49 wt %, respectively. It was made obvious that, in both of Examples 1 and 2, the hydrogen release amounts were controlled by the ambient pressures in comparison with Comparative example.

Figure 4:
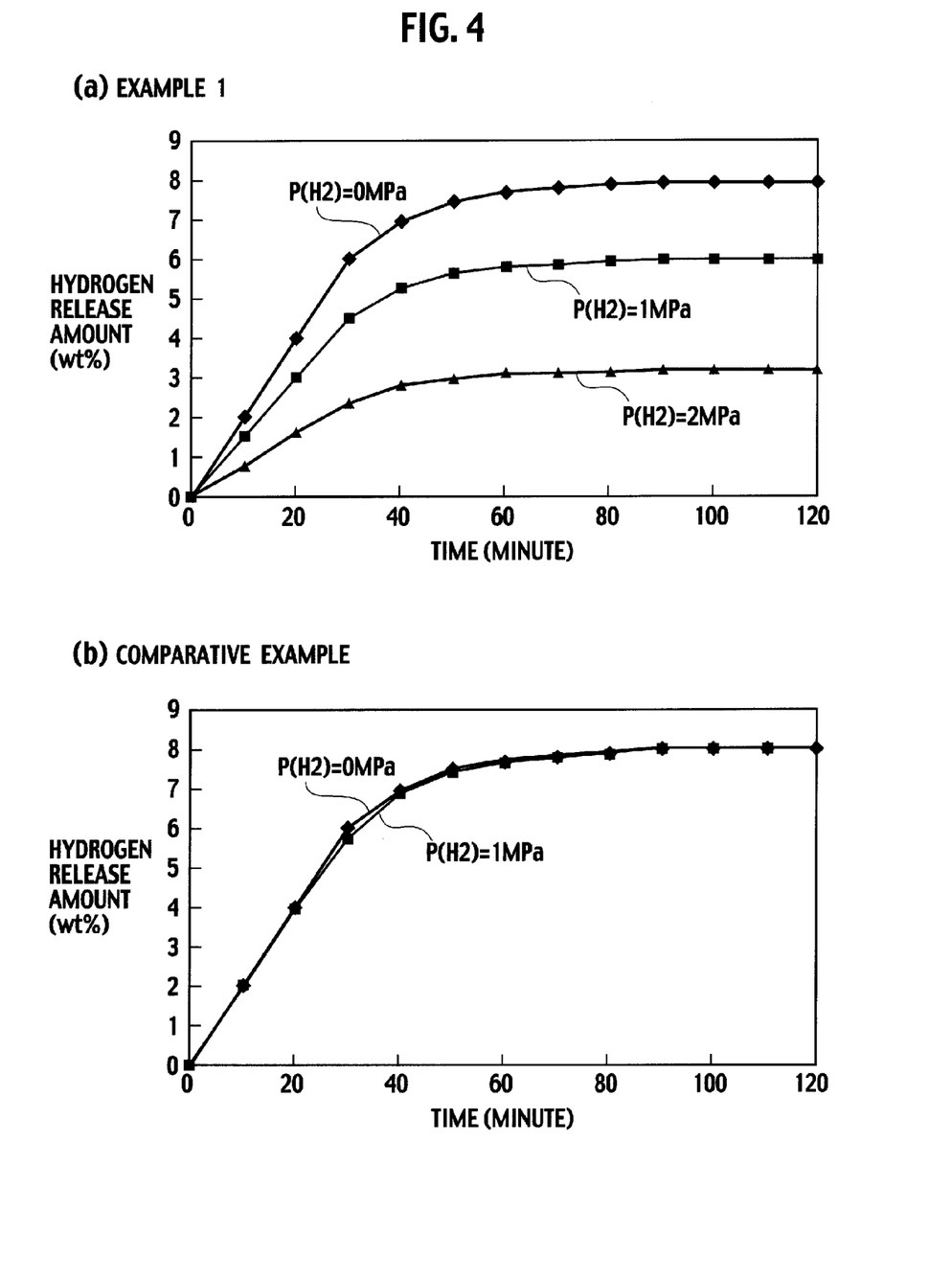
FIG. 4(a) is a graph showing time changes of such hydrogen release amounts of Example 1.
FIG. 4(b) is a graph showing time changes of such hydrogen release amounts of Comparative example.

FIGS. 4(a) and 4(b) are graphs showing time changes of the hydrogen release amounts of Example 1 and Comparative example. FIG. 4(a) shows the time changes of the hydrogen release amounts of Example 1, and FIG. 4(b) shows the time changes of the hydrogen release amounts of Comparative example. In both of Example 1 and Comparative example, until approximately 30 minutes elapsed since the start of the release, time courses and the hydrogen release amounts were substantially proportional to each other, and the hydrogen release rates were constant. However, what is understood is: the hydrogen release rates were lowered since 30 minutes elapsed; the hydrogen release rates were extremely lowered after 60 minutes elapsed; the hydrogen release was substantially stopped after approximately 90 minutes elapsed; and the hydrogen release amounts were not increased afterward.

In Example 1 shown in FIG. 4(a), a difference among the ambient pressures P(H2) largely affects the hydrogen release rates, and as the ambient hydrogen pressure of the hydrogen storage material is increased, the hydrogen release rate is lowered. In other words, in Example 1, the hydrogen release rate and the hydrogen release amount can be lowered by controlling the ambient hydrogen pressure of the hydrogen storage material. Incidentally, the respective hydrogen release amounts of Example 1, which were measured when 120 minutes elapsed since the start of the hydrogen release, were 3.2 wt % in the case where the ambient pressure P(H2) was 2 MPa, 6.0 wt % in the case where the ambient pressure P(H2) was 1 MPa, and 8.0 wt % in the case where the ambient pressure P(H2) was 0 MPa. In Comparative example shown in FIG. 4(b), the hydrogen release amounts exhibited substantially similar values in both of the cases where the ambient pressures P(H2) were 1 MPa and 0 MPa, and the hydrogen release amounts measured when 120 minutes elapsed since the start of the hydrogen release were 8.0 wt % at both of the ambient pressures.

Figure 5:
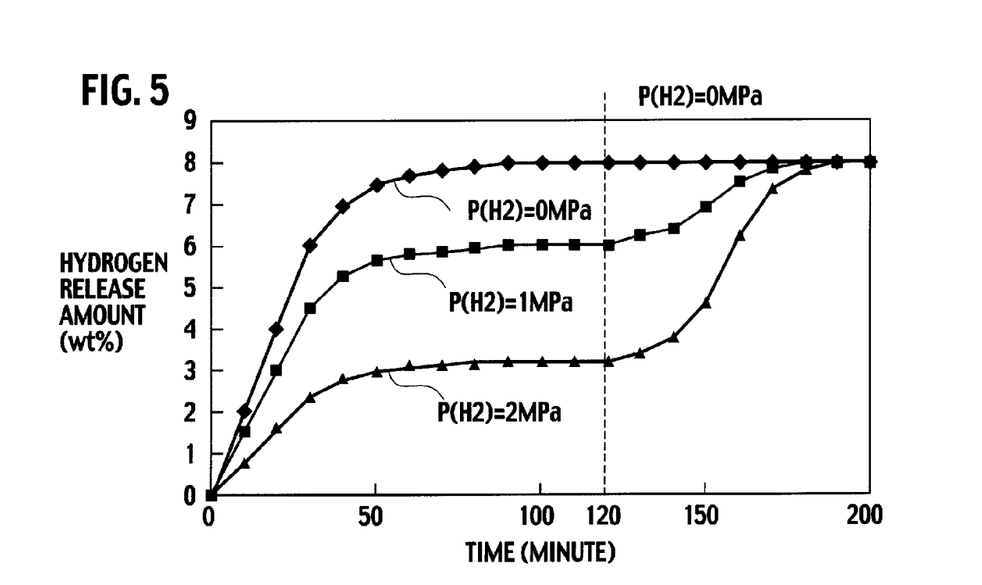
FIG. 5 is a graph showing time changes of the hydrogen release amounts in a case of lowering the ambient pressures to 0 MPa after releasing hydrogen for 120 minutes at the ambient pressures of 0 MPa, 1 MPa and 2 MPa.

FIG. 5 is a graph showing results of measuring the hydrogen release amounts in the case of lowering the ambient pressures P(H2) to 0 MPa after releasing hydrogen for 120 minutes at the respective ambient pressures of 0 MPa, 1 MPa and 2 MPa. It was confirmed that the hydrogen release amounts were increased up to 8 wt % by lowering the ambient pressures.

(Hydrogen Supply System)

Figure 6:
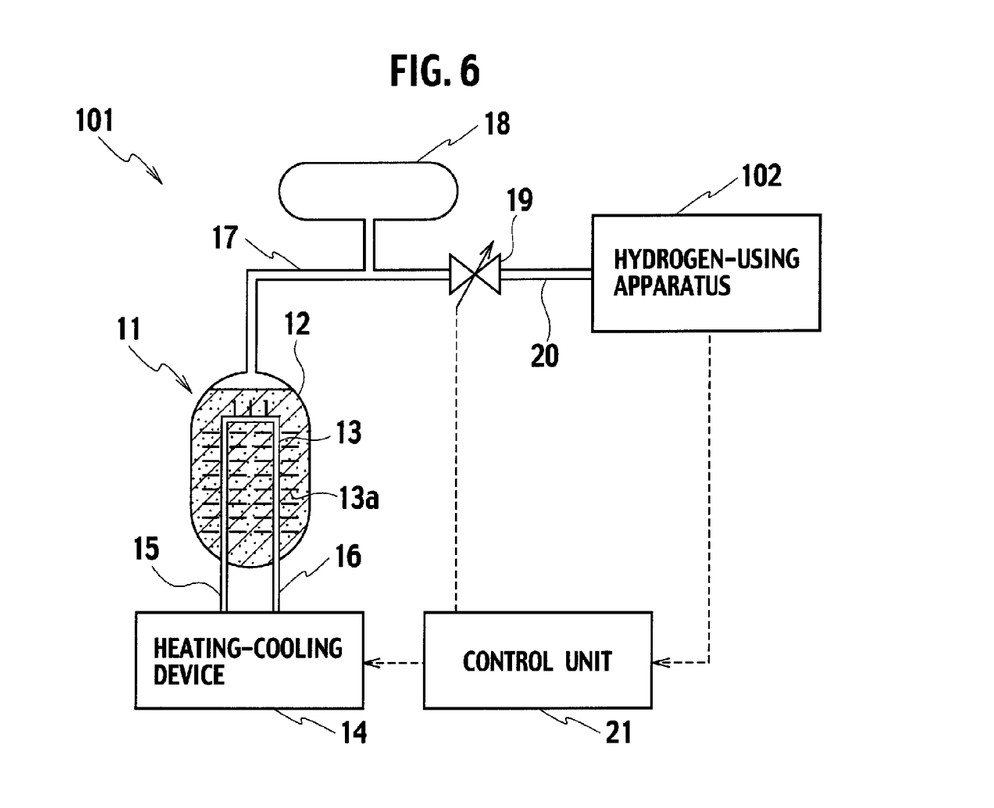
FIG. 6 is a system configuration diagram explaining a configuration of a hydrogen supply system of a first embodiment.

Next, a description will be made of a hydrogen supply system using the hydrogen storage material according to the present invention. FIG. 6 is a system configuration diagram explaining a first embodiment of the hydrogen supply system. In FIG. 6, the hydrogen supply system 101 includes: a container 11; the hydrogen storage material 12 contained in the container 11; a heat exchanger 13 provided in the container 11; a heating-cooling device 14 that heats and cools a heating medium; a heating medium supply pipe 15 that supplies the heating medium from the heating-cooling device 14 to the heat exchanger 13; and a heating medium discharge pipe 16 that discharges the heating medium from the heat exchanger 13 to the heating-cooling device 14. Moreover, the hydrogen supply system 101 includes: a coupling pipe 17 that supplies hydrogen, which is generated in the container 11, to a reserve tank 18 and a supply valve 19; a supply pipe 20 that supplies hydrogen from the supply valve 19 to a hydrogen-using apparatus 102; and a control unit 21 that controls an operation of the heating-cooling device 14 and an opening angle of the supply valve 19 based on a request for hydrogen from the hydrogen-using apparatus 102. Moreover, in the case where the hydrogen release rate of the hydrogen storage material is sufficiently rapid, a space portion in the container filled with the hydrogen storage material can be used as a reserve tank, and high-pressure hydrogen can be stored therein.

The container 11 is a container provided with heat resistance for enduring a hydrogen release temperature of the first storage material body composing the hydrogen storage material 12, and with pressure resistance for enduring the hydrogen equilibrium pressure of the second storage material body composing the hydrogen storage material 12. For example, in the case of using aluminium hydride as the first storage material body, and using sodium aluminium hydride as the second storage material body, such a heat resistance temperature of the container 11 just needs to be 250 degrees Celsius or more, and such a withstand pressure thereof just needs to be 2 MPa or more.

As a material of the container 11, austenite-based stainless steel that is less likely to cause hydrogen embrittlement can be used. As the austenite-based stainless steel, SUS 304, 316 with a face-centered cubic structure, and the like are mentioned. Moreover, besides the above, as the material of the container, there can be used a composite material in which carbon fiber and the like are bound by resin, or aluminium. The heat exchanger 13 includes a plurality of fins 13a functioning to transfer heat, and exchanges the heat between the heating medium and the container 11 and the hydrogen storage material 12.

Based on the control of the control unit 21, the heating-cooling device 14 heats or cools the heating medium, and circulates the heating medium between the heating-cooling device 14 and the heat exchanger 13. In such a way, the heating-cooling device 14 heats or cools the container 11 and the hydrogen storage material 12 contained therein. The heating medium used here is a heating medium provided with stability at the hydrogen release temperature of the hydrogen storage material 12.

The coupling pipe 17 is a conduit pipe that couples the container 11, the reserve tank 18 and the supply valve 19 to one another, and supplies hydrogen, which is generated in the container 11, to the reserve tank 18 and the supply valve 19. The reserve tank is a tank that has the same pressure resistance as that of the container 11, and temporarily reserves the generated hydrogen. The supply valve 19 is a valve in which opening and closing and the opening angle are controlled from the control unit 21, whereby a flow rate of hydrogen flowing therethrough is adjusted. Hydrogen that has passed through the supply valve 19 is supplied to the hydrogen-using apparatus 102 through the supply pipe 20.

The control unit 21 receives such a request for the hydrogen supply and a required amount (flow rate) of hydrogen from the hydrogen-using apparatus 102, controls the heating-cooling device 14 and the supply valve 19, and controls the hydrogen supply to the hydrogen-using apparatus 102. Although there are no particular limitations, the control unit 21 can be composed of a microprocessor including a CPU, a program ROM, a working RAM and an input-output interface.

The hydrogen-using apparatus 102 is an apparatus that receives the hydrogen supply from the hydrogen supply system according to the present invention, and uses hydrogen. As the hydrogen-using apparatus 102, there are mentioned an internal combustion engine, a fuel cell stack and the like, which use hydrogen as fuel. The above-described hydrogen supply system and internal combustion engine are mountable on a hydrogen fuel vehicle. The hydrogen supply system and the fuel cell stack are mountable on a fuel cell electric vehicle. Moreover, as the hydrogen-using apparatus 102, suitable is a portable fuel cell that uses hydrogen as fuel, and serves for supplying electric power to a portable electronic instrument such as a notebook personal computer and a cellular phone.

Figure 7:
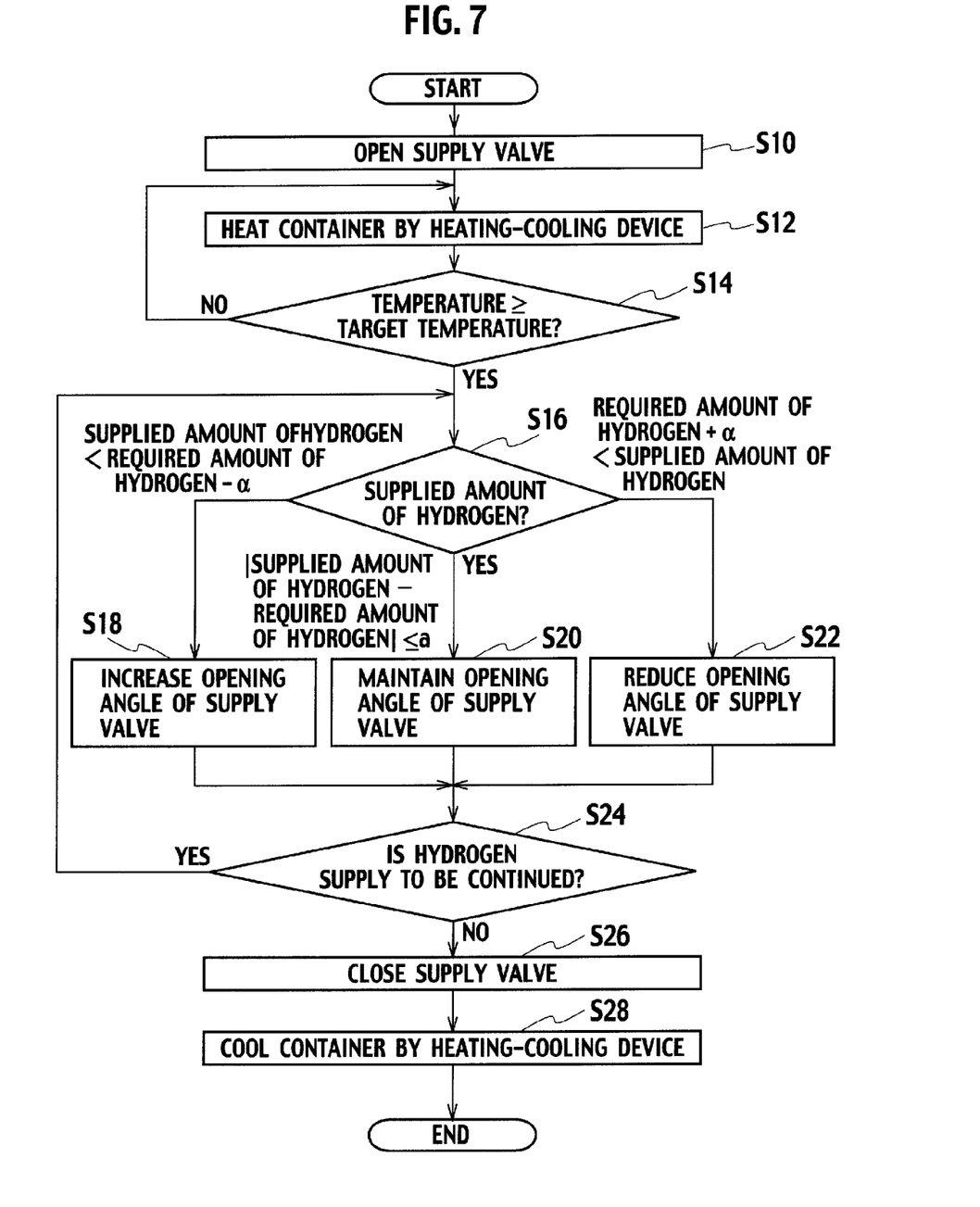
FIG. 7 is a flowchart explaining a hydrogen supply control in the hydrogen supply system of the first embodiment.

Next, a description will be made of the hydrogen supply control of the control unit 21 in the above-described hydrogen supply system with reference to a control flowchart of FIG. 7. A feature of this hydrogen supply control is that an amount of hydrogen to be supplied from the hydrogen supply system 101 to the hydrogen-using apparatus 102 is controlled by controlling the opening angle of the supply valve 19. The hydrogen-using apparatus 102 requires the hydrogen supply for the control unit 21, whereby execution of this flowchart is started.

First, in Step S10, the control unit 21 outputs an opening signal to the supply valve 19, and opens the supply valve 19. Subsequently, in Step S21, the control unit 21 outputs a heating instruction signal to the heating-cooling device 14. The heating-cooling device 14 that has received the heating instruction signal heats the heating medium, circulates the heating medium between the heating-cooling device 14 and the heat exchanger 13, and thereby heats the heat exchanger 13 placed in the container 11. The heat exchanger 13 heats the container 11 and the hydrogen storage material 12 contained therein. As a result, the temperature of the hydrogen storage material 12 rises.

Subsequently, in Step S14, the control unit 21 detects a temperature of the container 11 or the hydrogen storage material 12 by a temperature sensor that is not shown in FIG. 6, and determines whether or not the detected temperature has reached a preset target temperature or more. It is defined that this target temperature is set in response to the hydrogen release temperature of the first storage material body composing the hydrogen storage material 12. For example, in the case where the hydrogen storage material body is aluminium hydride, the target temperature is approximately 200 degrees Celsius.

In the case where the temperature is not the target temperature or more as a result of the determination in Step S14, the control unit 21 returns to Step S12, and continues to heat the container 11 and the hydrogen storage material 12. In the case where the temperature is the target temperature or more as a result of the determination in Step S14, the control unit 21 proceeds to Step S16. In Step S16, the control unit 21 determines whether or not such a supplied amount of hydrogen is substantially equal to such a required amount of hydrogen, and determines which of the supplied amount and the required amount is larger in the case where both of them are not substantially equal to each other. For these determinations, for example, three factors, which are: the required amount of hydrogen−alpha; the supplied amount of hydrogen; and the required amount of hydrogen+alpha, are compared with one another. Here, the alpha is a tolerance of the supplied amount of hydrogen with respect to the required amount of hydrogen. In the case of setting a value of the alpha, a value at which such a disadvantage as hunting does not occur in the control for the supplied amount of hydrogen is set in consideration for characteristics of the hydrogen-using apparatus 102, a measurement error in the supplied amount of hydrogen, a control error of the control unit 21, and the like. Note that a sensor for the supplied amount of hydrogen, which is not shown in FIG. 6, may be provided in either the hydrogen supply system 101 or the hydrogen-using apparatus 102. In the case of providing such a hydrogen supply amount sensor in the hydrogen-using apparatus 102, a detection value of the supplied amount of hydrogen is sent to the control unit 21 together with the required amount of hydrogen.

In the case where the required amount of hydrogen−alpha is larger than the supplied amount of hydrogen as a result of the determination in Step S16, the control unit 21 determines that the supplied amount of hydrogen is insufficient, and proceeds to Step S18. Then, the control unit 21 increases the opening angle of the supply valve 19, and proceeds to Step S24. In the case where an absolute value of a value obtained by subtracting the required amount of hydrogen from the supplied amount of hydrogen is alpha or less as a result of the determination in Step S16, the control unit 21 determines that the supplied amount of hydrogen is substantially equal to the required amount of hydrogen (that a difference therebetween is within the tolerance), and proceeds to Step S20. Then, the control unit 21 maintains the opening angle of the supply valve 19, and proceeds to Step S24. In the case where the required amount of hydrogen+alpha are smaller than the supplied amount of hydrogen as a result of the determination in Step S16, the control unit 21 determines that the supplied amount of hydrogen is excessive, and proceeds to Step S22. Then, the control unit 21 reduces the opening angle of the supply valve 19, and proceeds to Step S24.

In Step S24, the control unit 21 determines whether or not the hydrogen-using apparatus 102 continues to require that hydrogen be supplied thereto. If the hydrogen-using apparatus 102 continues to issue the above-described requirement, the control unit 21 returns to Step S16, and continues to supply hydrogen thereto. If the hydrogen-using apparatus 102 does not continue to issue the requirement, the control unit 21 proceeds to Step S26, closes the supply valve 19, and stops supplying hydrogen to the hydrogen-using apparatus 102. Subsequently, in Step S28, the control unit 21 sends a cooling instruction signal to the heating-cooling device 14, and the heating-cooling device 14 that has received the cooling instruction signal performs a cooling operation, and cools the container 11 and the hydrogen storage material 12. This cooling operation is stopped when the temperature detected by the temperature sensor falls down to a predetermined temperature. Then, the operation of the hydrogen supply system is stopped.

In accordance with the above-described hydrogen supply system of the first embodiment, the withstand pressure of the container that contains the hydrogen storage material can be decided with reference to the hydrogen equilibrium pressure of the second storage material body, which is lower than the hydrogen equilibrium pressure of the first storage material body. Therefore, withstand pressures of the constituent elements composing the hydrogen supply system are not increased unnecessarily, and the hydrogen supply system that supplies hydrogen from the metal hydride such as aluminium hydride in which the amount of hydrogen generated per unit weight is large can be constructed with ease.

Moreover, in accordance with the above-described hydrogen supply system, if the temperature of the container is raised to the target temperature once, then the supplied amount of hydrogen can be easily made to follow the required amount of hydrogen only by controlling the opening angle of the supply valve that supplies hydrogen to the hydrogen-using apparatus.

Figure 8:
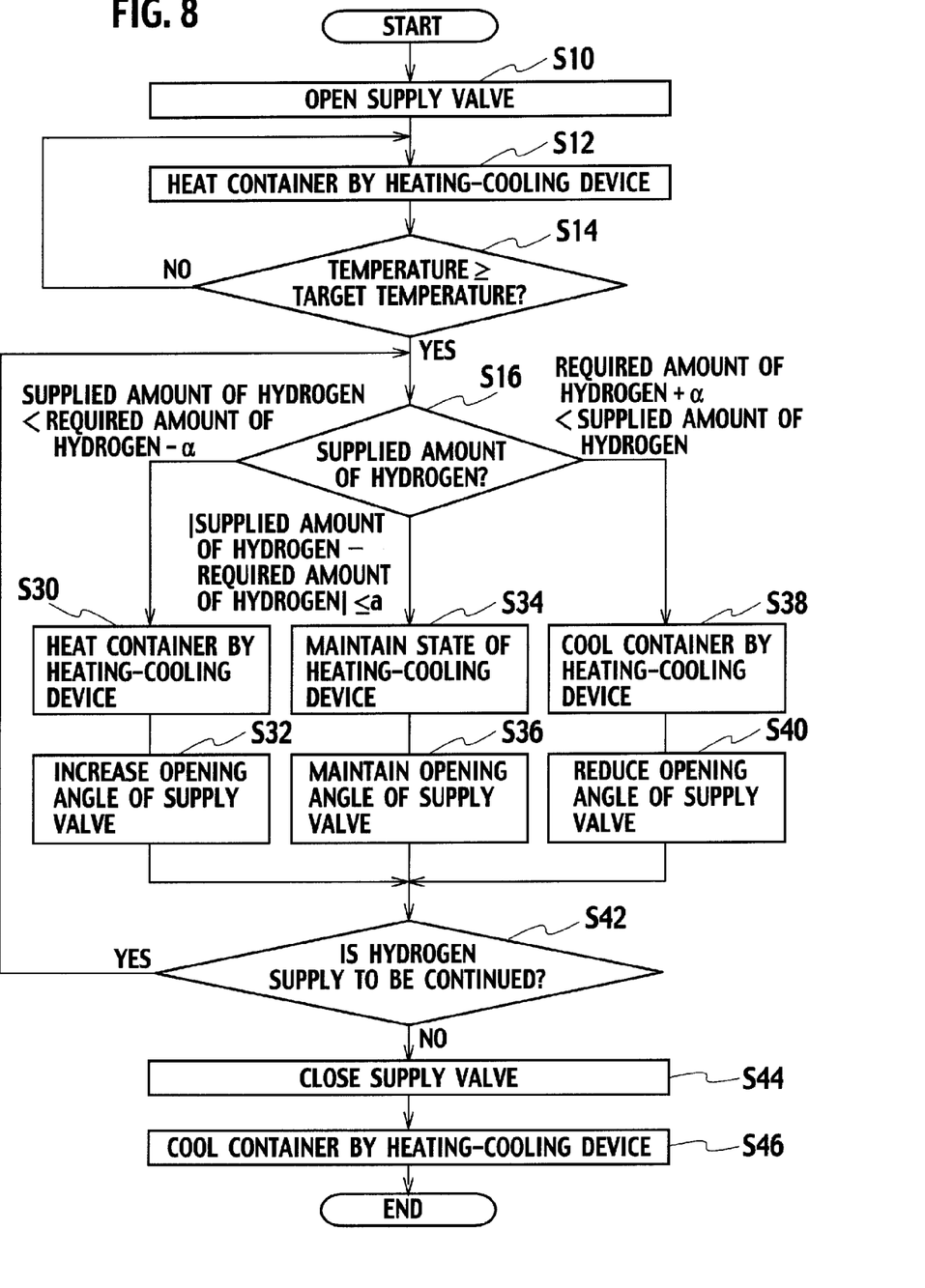
FIG. 8 is a flowchart explaining a hydrogen supply control in the hydrogen supply system of the second embodiment.

Next, a description will be made of a hydrogen supply system of a second embodiment. A hardware configuration of the hydrogen supply system of the second embodiment is similar to that shown in FIG. 6. However, this system is controlled as shown in a control flowchart of FIG. 8. A difference between the hydrogen supply controls of FIG. 7 and FIG. 8 is whether or not the heating-cooling device is controlled by the control unit 21. In the hydrogen supply control of FIG. 7, the supplied amount of hydrogen is controlled in accordance with the opening angle of the supply valve 19. However, in the hydrogen supply control of FIG. 8, the heating and cooling of the container 11 by the heating-cooling device 14 are controlled, and the supplied amount of hydrogen is controlled by controlling the opening angle of the supply valve 19.

Next, a description will be made of the hydrogen supply control of the control unit 21 in the hydrogen supply system 101 with reference to the control flowchart of FIG. 8. The hydrogen-using apparatus 102 requires the hydrogen supply for the control unit 21, whereby execution of this flowchart is started. First, in Step S10, the control unit 21 outputs an opening signal to the supply valve 19, and opens the supply valve 19. Subsequently, in Step S21, the control unit 21 outputs a heating instruction signal to the heating-cooling device 14. The heating-cooling device 14 that has received the heating instruction signal heats the heating medium, circulates the heating medium between the heating-cooling device 14 and the heat exchanger 13, and thereby heats the heat exchanger 13 placed in the container 11. The heat exchanger 13 heats the container 11 and the hydrogen storage material 12 contained therein. As a result, the temperature of the hydrogen storage material 12 rises.

Subsequently, in Step S14, the control unit 21 detects a temperature of the container 11 or the hydrogen storage material 12 by a temperature sensor that is not shown in FIG. 6, and determines whether or not the detected temperature has reached a preset target temperature or more. It is defined that this target temperature is set in response to the hydrogen release temperature of the first storage material body composing the hydrogen storage material 12.

In the case where the temperature is not the target temperature or more as a result of the determination in Step S14, the control unit 21 returns to Step S12, and continues to heat the container 11 and the hydrogen storage material 12. In the case where the temperature is the target temperature or more as a result of the determination in Step S14, the control unit 21 proceeds to Step S16. In Step S16, the control unit 21 determines whether or not the supplied amount of hydrogen is substantially equal to the required amount of hydrogen, and determines which of the supplied amount and the required amount is larger in the case where both of them are not substantially equal to each other. For these determinations, for example, three factors, which are: the required amount of hydrogen−alpha; the supplied amount of hydrogen; and the required amount of hydrogen+alpha, are compared with one another. Here, the alpha is a tolerance of the supplied amount of hydrogen with respect to the required amount of hydrogen. A setting method of the value of alpha is similar to that in the case of FIG. 7.

In the case where the required amount of hydrogen−alpha is larger than the supplied amount of hydrogen as a result of the determination in Step S16, the control unit 21 determines that the supplied amount of hydrogen is insufficient, and proceeds to Step S30. Then, in Step S30, the control unit 21 outputs a heating instruction signal to the heating-cooling device 14. The heating-cooling device 14 that has received the heating instruction signal heats the heating medium and circulates the heating medium between the heating-cooling device 14 and the heat exchanger 13, and thereby heats the heat exchanger 13 placed in the container 11. The heat exchanger 13 heats the hydrogen storage material 12 contained in the container 11. As a result, the temperature of the hydrogen storage material 12 rises. Subsequently, in Step S32, the control unit 21 increases the opening angle of the supply valve 19, and proceeds to Step S42.

In the case where an absolute value of a value obtained by subtracting the required amount of hydrogen from the supplied amount of hydrogen is alpha or less as a result of the determination in Step S16, the control unit 21 determines that the supplied amount of hydrogen is substantially equal to the required amount of hydrogen (that a difference therebetween is within the tolerance), and proceeds to Step S34. Then, in Step S34, the control unit 21 maintains a heating state of the heating-cooling device 14 if the heating-cooling device 14 is in this heating state, and maintains a cooling state of the heating-cooling device 14 if the heating-cooling device 14 is in this cooling state. Thereafter, the control unit 21 proceeds to Step S36. In Step S36, the control unit 21 maintains the opening angle of the supply valve 19, and proceeds to Step S42.

In the case where the required amount of hydrogen+alpha are smaller than the supplied amount of hydrogen as a result of the determination in Step S16, the control unit 21 determines that the supplied amount of hydrogen is excessive, and proceeds to Step S38. In Step S38, the control unit 21 outputs a cooling instruction signal to the heating-cooling device 14. The heating-cooling device 14 that has received the cooling instruction signal cools the heating medium and circulates the heating medium between the heating-cooling device 14 and the heat exchanger 13, and thereby cools the heat exchanger 13 placed in the container 11. The heat exchanger 13 cools the hydrogen storage material 12 contained in the container 11. As a result, the temperature of the hydrogen storage material 12 drops. Subsequently, in Step S40, the control unit 21 reduces the opening angle of the supply valve 19, and proceeds to Step S42.

In Step S42, the control unit 21 determines whether or not the hydrogen-using apparatus 102 continues to require that hydrogen be supplied thereto. If the hydrogen-using apparatus 102 continues to issue the above-described requirement, the control unit 21 returns to Step S16, and continues to supply hydrogen thereto. If the hydrogen-using apparatus 102 does not continue to issue the requirement, the control unit 21 proceeds to Step S44, closes the supply valve 19, and stops supplying hydrogen to the hydrogen-using apparatus 102. Subsequently, in Step S46, the control unit 21 sends a cooling instruction signal to the heating-cooling device 14, and the heating-cooling device 14 that has received the cooling instruction signal performs a cooling operation, and cools the container 11 and the hydrogen storage material 12. This cooling operation is stopped when the temperature detected by the temperature sensor falls down to the predetermined temperature. Then, the operation of the hydrogen supply system is stopped.

In accordance with the above-described hydrogen supply system of the second embodiment, the withstand pressure of the container that contains the hydrogen storage material can be decided with reference to the hydrogen equilibrium pressure of the second storage material body, which is lower than the hydrogen equilibrium pressure of the first storage material body. Therefore, the withstand pressures of the constituent elements composing the hydrogen supply system are not increased unnecessarily, and the hydrogen supply system that supplies hydrogen from the metal hydride such as aluminium hydride in which the amount of hydrogen generated per unit weight is large can be constructed with ease.

Moreover, in accordance with the hydrogen supply control of FIG. 8, a highly precise control for the supplied amount of hydrogen can be performed by the control for the opening angle of the supply valve and the heating-cooling controls for the container by the heating-cooling device.

Figure 9:
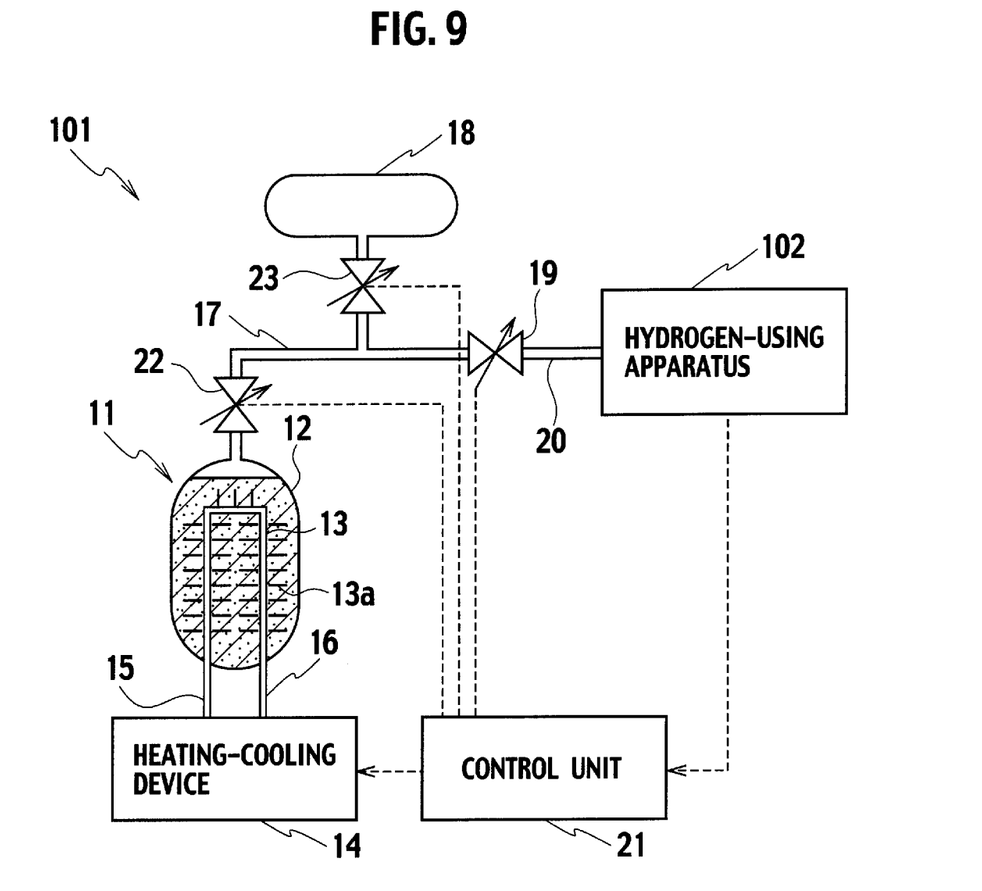
FIG. 9 is a system configuration diagram explaining a configuration of a hydrogen supply system of a third embodiment.

Next, a description will be made of a third embodiment of the hydrogen supply system. FIG. 9 is a system configuration diagram explaining a configuration of the hydrogen supply system of the third embodiment. The hydrogen supply system of the third embodiment has a configuration in which, to the configuration of the first embodiment shown in FIG. 6, a container valve 22 is added between the container 11 and the coupling pipe 17, and a reserve tank valve 23 is added between the coupling pipe 17 and the reserve tank 18. The container valve 22 opens and closes an outlet of the container, is capable of adjusting an opening angle thereof, and is provided in the vicinity of the container 11. The reserve tank valve 23 opens and closes a port of the reserve tank, and is capable of adjusting an opening angle thereof. The container valve 22 and the reserve tank valve 23 are controlled to open and close from the control unit 21, and the opening angles thereof are controlled similarly from the control unit 21. Other configurations are similar to those of the first embodiment, and accordingly, the same reference numerals are assigned to the same constituent elements, and a duplicate description will be omitted.

Figure 10:
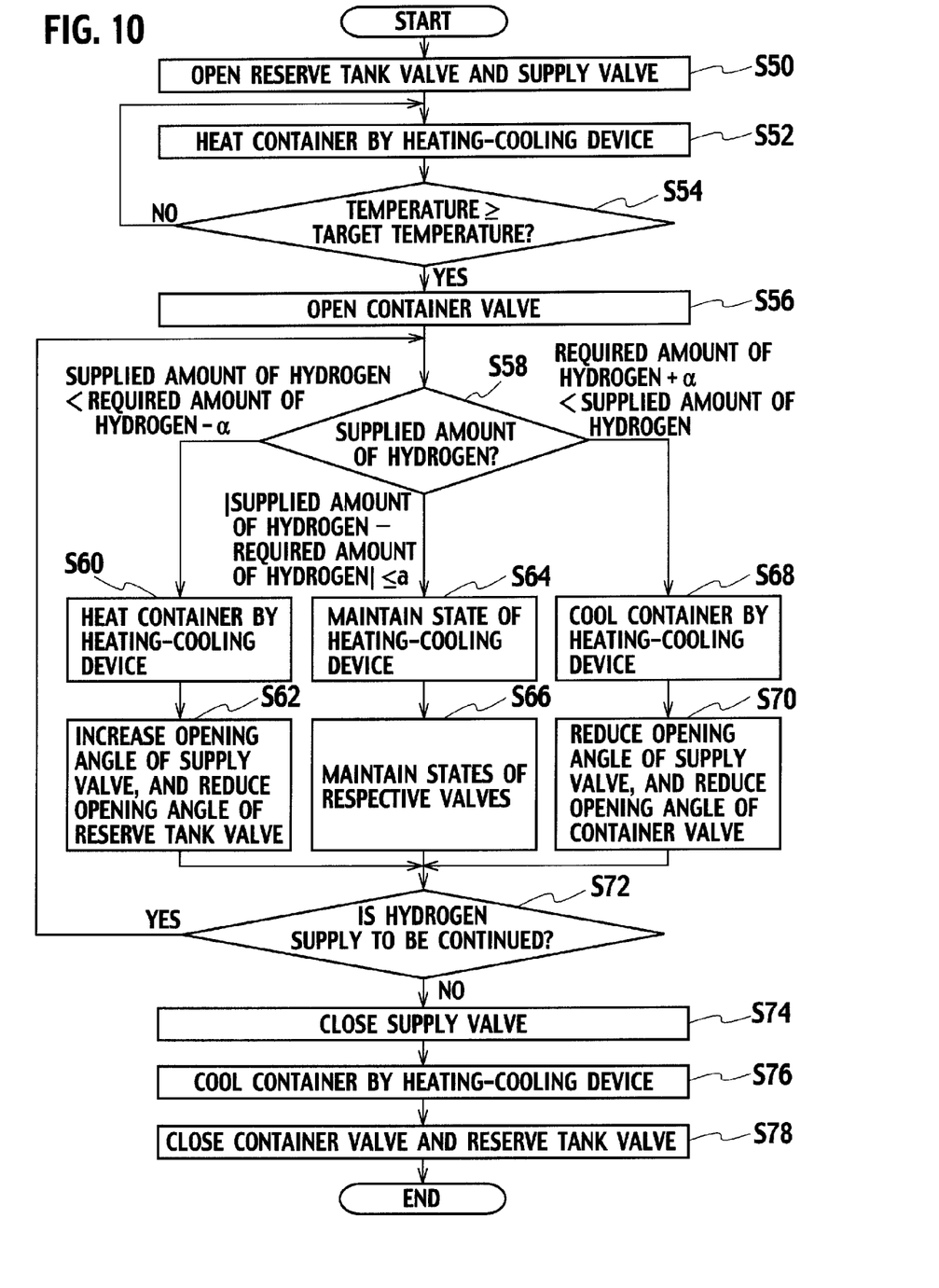
FIG. 10 is a flowchart explaining a hydrogen supply control in the hydrogen supply system of the third embodiment.

Next, a description will be made of such a hydrogen supply control of the control unit 21 in the hydrogen supply system of the third embodiment with reference to a control flowchart of FIG. 10. The hydrogen-using apparatus 102 requires the hydrogen supply for the control unit 21, whereby execution of this flowchart is started.

First, in Step S50, the control unit 21 outputs opening signals to the reserve tank valve 23 and the supply valve 19, and opens the reserve tank valve 23 and the supply valve 19. Subsequently, in Step S52, the control unit 21 outputs a heating instruction signal to the heating-cooling device 14. The heating-cooling device 14 that has received the heating instruction signal heats the heating medium, circulates the heating medium between the heating-cooling device 14 and the heat exchanger 13, and thereby heats the heat exchanger 13 placed in the container 11. The heat exchanger 13 heats the container 11 and the hydrogen storage material 12 contained therein. As a result, the temperature of the hydrogen storage material 12 rises.

Subsequently, in Step S54, the control unit 21 detects the temperature of the container 11 or the hydrogen storage material 12 by the temperature sensor that is not shown in FIG. 6, and determines whether or not the detected temperature has reached the preset target temperature or more. It is defined that this target temperature is set in response to the hydrogen release temperature of the first storage material body composing the hydrogen storage material 12.

In the case where the temperature is not the target temperature or more as a result of the determination in Step S54, the control unit 21 returns to Step S52, and continues to heat the container 11 and the hydrogen storage material 12. In the case where the temperature is the target temperature or more as a result of the determination in Step S54, the control unit 21 proceeds to Step S56. In Step S56, the control unit 21 outputs an opening signal to the container valve 22, opens the container valve 22, and proceeds to Step S58.

In Step S58, the control unit 21 determines whether or not the supplied amount of hydrogen is substantially equal to the required amount of hydrogen, and determines which of the supplied amount and the required amount is larger in the case where both of them are not substantially equal to each other. For these determinations, for example, three factors, which are: the required amount of hydrogen−alpha; the supplied amount of hydrogen; and the required amount of hydrogen+alpha, are compared with one another. Here, the alpha is a tolerance of the supplied amount of hydrogen with respect to the required amount of hydrogen. A setting method of the value of alpha is similar to that of the first embodiment.

In the case where the required amount of hydrogen−alpha is larger than the supplied amount of hydrogen as a result of the determination in Step S58, the control unit 21 determines that the supplied amount of hydrogen is insufficient, and proceeds to Step S60. Then, in Step S60, the control unit 21 outputs a heating instruction signal to the heating-cooling device 14. The heating-cooling device 14 that has received the heating instruction signal heats the heating medium and circulates the heating medium between the heating-cooling device 14 and the heat exchanger 13, and thereby heats the heat exchanger 13 placed in the container 11. The heat exchanger 13 heats the hydrogen storage material 12 contained in the container 11. As a result, the temperature of the hydrogen storage material 12 rises. Subsequently, in Step S62, the control unit 21 increases the opening angle of the supply valve 19, reduces the opening angle of the reserve tank 23, and proceeds to Step S72.

In the case where an absolute value of a value obtained by subtracting the required amount of hydrogen from the supplied amount of hydrogen is alpha or less as a result of the determination in Step S58, the control unit 21 determines that the supplied amount of hydrogen is substantially equal to the required amount of hydrogen (that a difference therebetween is within the tolerance), and proceeds to Step S64. Then, in Step S64, the control unit 21 maintains a heating state of the heating-cooling device 14 if the heating-cooling device 14 is in this heating state, and maintains a cooling state of the heating-cooling device 14 if the heating-cooling device 14 is in this cooling state. Thereafter, the control unit 21 proceeds to Step S66. In Step S66, the control unit 21 maintains the respective opening angles of the supply valve 19, the container valve 22 and the reserve tank valve 23, and proceeds to Step S72.

In the case where the required amount of hydrogen+alpha are smaller than the supplied amount of hydrogen as a result of the determination in Step S58, the control unit 21 determines that the supplied amount of hydrogen is excessive, and proceeds to Step S68. In Step S68, the control unit 21 outputs a cooling instruction signal to the heating-cooling device 14. The heating-cooling device 14 that has received the cooling instruction signal cools the heating medium and circulates the heating medium between the heating-cooling device 14 and the heat exchanger 13, and thereby cools the heat exchanger 13 placed in the container 11. The heat exchanger 13 cools the hydrogen storage material 12 contained in the container 11. As a result, the temperature of the hydrogen storage material 12 drops. Subsequently, in Step S70, the control unit 21 reduces the opening angle of the supply valve 19, reduces the opening angle of the container valve 22, and proceeds to Step S72.

In Step S72, the control unit 21 determines whether or not the hydrogen-using apparatus 102 continues to require that hydrogen be supplied thereto. If the hydrogen-using apparatus 102 continues to issue the above-described requirement, the control unit 21 returns to Step S58, and continues to supply hydrogen thereto. If the hydrogen-using apparatus 102 does not continue to issue the requirement, the control unit 21 proceeds to Step S74, closes the supply valve 19, and stops supplying hydrogen to the hydrogen-using apparatus 102. Subsequently, in Step S76, the control unit 21 sends a cooling instruction signal to the heating-cooling device 14, and the heating-cooling device 14 that has received the cooling instruction signal performs the cooling operation, and cools the container 11 and the hydrogen storage material 12. This cooling operation is stopped when the temperature detected by the temperature sensor falls down to the predetermined temperature. Subsequently, in Step S78, the control unit 21 closes the container valve 22 and the reserve tank valve 23, whereby the operation of the hydrogen supply system is stopped.

In accordance with the above-described hydrogen supply system of the third embodiment, the withstand pressure of the container that contains the hydrogen storage material can be decided with reference to the hydrogen equilibrium pressure of the second storage material body, which is lower than the hydrogen equilibrium pressure of the first storage material body. Therefore, the withstand pressures of the constituent elements composing the hydrogen supply system are not increased unnecessarily, and the hydrogen supply system that supplies hydrogen from the metal hydride such as aluminium hydride in which the amount of hydrogen generated per unit weight is large can be constructed with ease.

Moreover, in accordance with the above-described hydrogen supply system of the third embodiment, in addition to the supply valve that supplies hydrogen to the hydrogen-using apparatus, the container valve and the reserve tank valve are provided, and the opening angles of these valves are adjusted in response to the tolerance between the required amount of hydrogen and the supply amount of hydrogen. Therefore, hydrogen supply that is highly precise and highly responsive can be performed.

The entire contents of a Japanese Patent Application No. P2007-319769 with a filing date of Dec. 11, 2007 and a Japanese Patent Application No. P2008-265453 with a filing date of Oct. 14, 2008 are herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

INDUSTRIAL APPLICABILITY

In the hydrogen storage material according to the present invention, the surface of the first storage material body is coated with the second storage material body, and the hydrogen equilibrium pressure at the hydrogen generation temperature of the first storage material body is set to be lower in the second storage material body than in the first storage material body. Therefore, when the entirety of the material is viewed, the hydrogen equilibrium pressure at the hydrogen generation temperature of the first storage material body becomes the hydrogen equilibrium pressure of the second storage material body, which is lower. Hence, even in the case of using a material in which the hydrogen equilibrium pressure is high as the first storage material body, the withstand pressure of the container of the hydrogen storage material can be set with reference to the hydrogen equilibrium pressure of the second storage material body. Moreover, the hydrogen release from the hydrogen storage material can be controlled by the hydrogen equilibrium pressure of the second storage material body, which is relatively low.

The invention claimed is:

1. A hydrogen storage material, comprising:
    a first storage material body which stores hydrogen, and comprises a first metal hydride being at least one selected from the group consisting of aluminium hydride, a hydrogen absorbing alloy containing magnesium, and a hydrogen absorbing alloy containing titanium; and
    a second storage material body which stores hydrogen, coats a surface of the first storage material body, and comprises a second metal hydride being at least one selected from the group consisting of a hydride of aluminium and an alkaline metal, a hydride of aluminium and an alkaline earth metal, a hydride of boron and an alkaline metal, and a hydride of boron and an alkaline earth metal,
    wherein a hydrogen equilibrium pressure of the second storage material body is lower than that of the first storage material body at a hydrogen generation temperature of the first storage material body.

2. The hydrogen storage material according to claim 1, wherein the surface of the first storage material body is completely coated with the second metal hydride.

3. The hydrogen storage material according to claim 1, wherein a region having a composition in which components of the first storage material body and the second storage material body are mixed together exists between the first metal hydride and the second metal hydride.

4. The hydrogen storage material according to claim 1, wherein the second metal hydride is dissolved in a nonpolar organic solvent.

5. A method for producing the hydrogen storage material according to claim 1, the method comprising:
    preparing a solution in which the second metal hydride is dissolved in a nonpolar organic solvent, the second metal hydride being at least one selected from the group consisting of a hydride of aluminium and an alkaline metal, a hydride of aluminium and an alkaline earth metal, a hydride of boron and an alkaline metal, and a hydride of boron and an alkaline earth metal;
    applying the solution on the surface of the first metal hydride or impregnating the solution into the surface of the first metal hydride, the first metal hydride being at least one selected from the group consisting of aluminium hydride, a hydrogen absorbing alloy containing magnesium, and a hydrogen absorbing alloy containing titanium; and
    evaporating the solvent from the first metal hydride.

6. A hydrogen supply system which supplies hydrogen from the hydrogen storage material according to claim 1 to an outside of the hydrogen supply system, the system comprising:
    a container which contains the hydrogen storage material;
    a heating-cooling device which heats and cools the hydrogen storage material contained in the container;
    a supply pipe which is connected to the container, and supplies hydrogen to an outside of the hydrogen supply system, the hydrogen being generated in the container;
    a supply valve which is provided on the supply pipe, and adjusts a flow rate of hydrogen flowing through the supply pipe; and
    a reserve tank which is connected between the container and the supply valve, and temporarily reserves hydrogen.

7. The hydrogen supply system according to claim 6, further comprising:
    a container valve which is provided in a vicinity of the container, and opens and closes an outlet of the container; and
    a reserve tank valve which is provided between the reserve tank and the supply pipe, and opens and closes a port of the reserve tank.

8. The hydrogen supply system according to claim 7, further comprising:
    a controller which, based on a required amount of hydrogen and a supplied amount of hydrogen, controls an opening angle of the supply valve, the container valve or the reserve tank valve, or controls heating and cooling by the heating-cooling device.

9. A fuel cell which uses, as fuel, hydrogen supplied thereto from the hydrogen supply system according to claim 6.

10. An internal combustion engine which uses, as fuel, hydrogen supplied thereto from the hydrogen supply system according to claim 6.

11. A vehicle comprising:
    a fuel cell according to claim 9.

12. A vehicle comprising:
    an internal combustion engine according to claim 10.

13. The hydrogen storage material according to claim 1, wherein the first metal hydride is aluminium hydride, and the second metal hydride is sodium aluminium hydride.

* * * * *